United States Patent

Colebourne et al.

[15] 3,660,030

[45] May 2, 1972

[54] METHOD OF PREPARING NITROSYL CHLORIDE

[72] Inventors: Neville Colebourne; Philip Richard Edwards, both of Runcorn, England

[73] Assignee: Imperial Chemical Industries Limited, London, England

[22] Filed: Apr. 6, 1970

[21] Appl. No.: 26,156

[30] Foreign Application Priority Data

Apr. 21, 1969 Great Britain......................20,286/69

[52] U.S. Cl. ..........................................................23/203 N
[51] Int. Cl. .......................................................C01b 21/52
[58] Field of Search..............................23/203, 203 N, 157 A

[56] References Cited

UNITED STATES PATENTS

| | | | |
|---|---|---|---|
| 3,290,115 | 12/1966 | Smai et al. | 23/203 N |
| 3,214,240 | 10/1965 | Beekhuis | 23/203 N |
| 3,318,665 | 5/1967 | Schmidt et al. | 23/203 N |
| 1,930,664 | 10/1933 | Rosenstein | 23/157 A |
| 2,366,518 | 2/1945 | Crebe et al. | 23/203 N |

*Primary Examiner*—Earl C. Thomas
*Attorney*—Cushman, Darby & Cushman

[57] ABSTRACT

A process for the preparation of nitrosyl chloride which comprises reacting together hydrogen chloride and nitrogen dioxide in the presence of nitric acid.

9 Claims, No Drawings

METHOD OF PREPARING NITROSYL CHLORIDE

This invention relates to the preparation of inorganic halides and more particularly to the preparation of nitrosyl chloride.

According to our invention we provide a process for the preparation of nitrosyl chloride which comprises reaction together hydrogen chloride and nitrogen dioxide in the presence of nitric acid.

The reaction may be carried out in a closed reaction vessel provided with means for heating or cooling as desired and made of suitably acid-resistant materials. The reactants, hydrogen chloride and nitrogen dioxide, can be fed to this reactor in any convenient liquid or gaseous form and the nitric acid can be added or drawn off as required to maintain the composition and quantity of the reaction mixture within desired limits.

The nitrogen dioxide may be added as such or as a mixture containing it, though it can if desired be formed in situ for example by introducing nitric oxide and an oxygen-containing gas (for example air) into the reactor. It is preferred to use the equilibrium mixture of nitrogen dioxide and dinitrogen tetroxide commonly described as nitrogen dioxide or nitrogen peroxide, and it is usually most convenient to introduce this in liquid form or to cause it to dissolve in the nitric acid. Alternatively, the nitrogen dioxide may be used in the form of the so-called nitrous anhydride (dinitrogen trioxide) which readily dissociates to form nitrogen dioxide (or dinitrogen tetroxide) and nitric oxide; if desired, an oxygen-containing gas may be added in conjunction with this to oxidize the nitric oxide, but this is not essential.

The hydrogen chloride may be added in the gaseous state or as an aqueous solution. Addition as gas is in general most convenient, but addition as aqueous solution often provides a useful means for maintaining the nitric acid at the desired concentration. By-product hydrochloric acid is commonly available in the form of aqueous solutions, for example the constant boiling mixture containing about 20 percent by weight of hydrogen chloride, and these can readily be used in our process.

The nitric acid used as reaction medium may contain water, which may be introduced by use of aqueous nitric acid and/or aqueous hydrochloric acid as feed stock. The reaction between nitrogen dioxide and hydrogen chloride results in the production of nitrosyl chloride and nitric acid, which increases the concentration of the nitric acid present and can compensate for the diluting effect of any water added.

As more nitric acid is formed, part of it can be bled off from the reaction mixture or can be diluted appropriately, as desired. When the nitrogen dioxide is used in the form of a mixture with nitric oxide (for example as the so-called dinitrogen trioxide) the formation of by-product nitric acid may be less. The concentration of the nitric acid in the reaction mixture is preferably maintained in the range 65 percent to 75 percent by total weight of the nitric acid and water present, though proportions outside this range may also be used.

To a certain extent the concentration may be self-regulating since if the nitric acid is more dilute than about 65 percent water reacts with nitrogen dioxide forming more nitric acid; if the nitric acid is more concentrated than about 75 percent it reacts with chloride ion to form chlorine, nitrosyl chloride and water. Other products may be formed, for example chlorine. Since the nitrosyl chloride is generally used as a source of chlorine, the presence of chlorine is not objectionable.

The proportions of nitrogen dioxide and hydrogen chloride used are preferably such as to provide two moles of nitrogen dioxide (or its equivalent, for example one mole of dinitrogen tetroxide) for each mole of hydrogen chloride. Larger or smaller proportions may be used but will usually lead to accumulation of one or the other reactant in the nitrosyl chloride or nitric acid produced. If nitrogen dioxide is present in a less than stoichiometric proportion, chlorine may be formed in larger proportions than when it is present in stoichiometric or excess of stoichiometric amounts.

If desired, a proportion of the hydrogen chloride may be replaced by a metal chloride or ammonium chloride whereby the nitrogen dioxide reacts with the metal or ammonium chloride to form the corresponding nitrate as by-product. Suitably the mole ratio of hydrogen chloride to other chloride may be from 1:9 to 9:1, preferably 3:2 to 2:3, though ratios outside this range may be used. Preferably the metal chloride is an alkali metal chloride or an alkaline earth metal chloride, for example sodium, potassium or calcium chloride.

All or part of the by-product nitric acid may be converted to a nitrate salt by neutralization of the effluent acid (after removal of nitrosyl chloride) for example with ammonia to form ammonium nitrate. When a metal or ammonium chloride has been used to form the corresponding nitrate, the nitric acid may be neutralizes after the nitrate has been removed. This is usually achieved by cooling the reaction mixture, after removal of the nitrosyl chloride to about 0° C. and then, for example filtering or centrifuging off the nitrate. Alternatively a slurry of the nitrate in at least a portion of the nitric acid may be removed from the reaction mixture and the slurry neutralized. Usually, sufficient nitric acid is neutralized so that the concentration of the acid remaining in the reaction vessel is maintained at the desired level for further production of nitrosyl chloride. The nitrate or mixed nitrates can be recovered by conventional means, for example by evaporation, cooling, filtration, centrifuging, or a combination of these operations. The resulting nitrates can be a useful source of chlorine-free fertilizer.

The temperature at which reaction is carried out may be varied but it is usually not necessary to exceed about 50° C. It is preferred to use a temperature no higher than 40° C., however, and especially a temperature no higher than 20° C. When the nitrogen dioxide and hydrogen chloride have reacted, the nitrosyl chloride product can be removed from the reaction mixture by volatilizing it at a higher temperature. The time required for reaction varies according to the temperature employed, but it is usually not more than about two hours. It is usually adequate to operate at substantially ambient atmospheric pressure, though higher or lower pressures may be used if desired.

In a preferred embodiment of the invention, the reaction is carried out in three stages. In the first stage hydrogen chloride is added to a liquid mixture of nitric acid and nitrogen dioxide, usually with vigorous stirring, at a temperature in the range −10° C. to +10° C. and maintained at this temperature until substantially all the conversion to nitrosyl chloride has occurred. This usually requires about two hours. In the second stage the mixture is then heated to a temperature in the range 10° C. to 20° C., to effect removal of substantially dry gaseous nitrosyl chloride from the reaction medium. Finally, in the third stage, the temperature is raised further to remove any remaining nitrosyl chloride and, if desired, a stripping gas (for example an inert gas, preferably nitrogen) is passed through the reaction medium to assist this. The temperature in this stage is preferably between 20° C. and 60° C.

In another embodiment, stages one and two are combined by maintaining the temperature at 10° C. to 20° C. during both stages.

The nitrosyl chloride may provide a useful source of chlorine. It may, for example, be oxidized to nitrogen dioxide and chlorine, which may be separated and the nitrogen dioxide may then be fed back and used to form more nitrosyl chloride. Alternatively, the nitrosyl chloride may be thermally decomposed to give a mixture comprising nitric oxide and chlorine. The nitric oxide component can then be oxidized to nitrogen dioxide which may be re-used in the process to make more nitrosyl chloride.

The chlorine obtained from the nitrosyl chloride may be used in conventional chlorination of ethylene to 1,2-dichloroethane which may then be cracked to give vinyl chloride and hydrogen chloride. The latter is then fed back to form more nitrosyl chloride. When the chlorine is obtained by thermal decomposition of the nitrosyl chloride it may be used in the chlorination reaction either after separation from the nitric oxide or before separation.

It will be appreciated that chlorinated hydrocarbons which have been obtained using chlorine sources other than the nitrosyl chloride prepared according to the invention may be cracked and the hydrogen chloride so obtained may be used to form nitrosyl chloride.

The invention is illustrated by the following Examples in which all percentages are by weight unless otherwise stated:

EXAMPLE 1

To aqueous nitric acid (30 ml of 69.6 percent acid) at 10° C. was added liquefied nitrogen dioxide (82 ml, 1.33 mole). Hydrogen chloride gas (48.7 gm, 1.33 mole) was then passed into the solution at the rate of 140 ml per minute, with vigorous stirring; this required about 2 hours. During the reaction, the temperature in the reactor vessel was maintained at 10° C. and no reactor off-gases were evolved.

The temperature of the reactor was then raised to and maintained at 20° C. for 30 minutes. Gas was given off at this temperature and samples were collected and analyzed by infra-red and mass spectrometry. The analyses showed that the samples consisted essentially of nitrosyl chloride. The remainder of the nitrosyl chloride was removed by warming the solution to 30° C. and stripping with a stream of nitrogen gas. The clear liquid remaining, which contained no chloride ions, was found to be 336 ml of 16.3 N nitric acid. The conversion of hydrochloric acid to nitrosyl chloride was 98 percent.

EXAMPLE 2

Potassium chloride (99 gm, 1.33 mole) was added with stirring to nitric acid (300 ml, 70 percent) maintained at a temperature of −3° C. to 0° C. Liquid nitrogen dioxide ($N_2O_4$, 164 ml, 2.66 mole) was then added over a period of 10 minutes. Hydrogen chloride gas (1.33 mole) was passed into the reactor at a rate of 136 ml/minute. This required about 4 hours. After the addition stirring was continued for a further 15 minutes. Unreacted gases were absorbed in a water scrubbing tower. Analysis of the scrubber water showed that 2.1 gm hydrogen chloride were unabsorbed. The reactor was then warmed to +5° C. when larger volumes of gas were evolved. These were condensed to a cherry-red liquid in a cold-trap at −75° C. The remaining dissolved gases were stripped out of the reactor at 30° C. with a stream of nitrogen, and liquefied by cooling, until the liquid in the reactor was colorless.

The final volume of the reactor liquid was 391 ml. 53 gm of nitric acid and 135 gm of potassium nitrate free from chloride ions were obtained. The conversion of potassium chloride to potassium nitrate was 100 percent and of hydrogen chloride to nitric acid was 63 percent.

196 gm of liquefied off-gases were obtained which on analysis were shown to contain approximately 60 percent of nitrosyl chloride; 15 percent of chlorine; 20 percent of nitrogen dioxide and 5 percent of hydrogen chloride, representing a 76 percent total conversion of hydrogen chloride and 84 percent total conversion of nitrogen dioxide.

EXAMPLE 3

This example illustrates the use of nitrogen dioxide in a less than stoichiometric amount with respect to chloride ion. Potassium chloride (37.3 gm, 0.5 mole) was added with stirring to nitric acid (112 gm, 70.7 percent) to form a slurry which was maintained at a temperature of 0° C. by means of a cooling bath. Stirring was maintained and nitrogen dioxide ($N_2O_4$ 69.0 gm, 0.75 mole) then added over a 15 minute period. After the elapse of a further minute, hydrogen chloride gas (16.3 gm, 0.45 mole) was added at a steady rate for 15 minutes. All the gas was absorbed in the slurry.

The stirred slurry was then warmed to 50° C. for 30 minutes, and this temperature maintained for about 20 minutes. Gases began to be evolved at 2° C. and evolution continued throughout the warming period. Finally a stream of nitrogen was passed through the solution to strip off the last of the volatile components from the mixture.

The gases evolved had the following composition:

| | |
|---|---|
| Nitrosyl chloride | 51.9 g. |
| Chlorine | 5.3 g. |
| Nitrogen dioxide | 3.3 g. |

The remaining slurry had the following composition:

| | |
|---|---|
| Potassium chloride | 0.4 g. |
| Potassium nitrate | 50.0 g. |
| Nitric acid | 88.2 g. |
| Water | 37.3 g. |

Conversions were as follows:

| | |
|---|---|
| Overall chloride ion to nitrosyl chloride | 83.3% |
| Overall chloride ion to chlorine | 15.7% |
| Potassium chloride to nitrosyl chloride | 99% |
| Hydrogen chloride to nitrosyl chloride | 66% |
| Potassium chloride to chlorine | 0% |
| Hydrogen chloride to chlorine | 34% |
| Overall nitrogen dioxide to nitrosyl chloride | 96% |

EXAMPLE 4

This example illustrates the use of equimolar amounts of potassium and hydrogen chloride and a stoichiometric amount of nitrogen dioxide.

Example 3 was repeated using the following quantities of reactants:

| | |
|---|---|
| Potassium chloride | 37.2 g. (0.5 mole) |
| Nitric acid | 80.4 g. |
| Water | 33.1 g. |
| Hydrogen chloride | 18.2 g. (0.5 mole) |
| Nitrogen dioxide ($N_2O_4$) | 92.0 g. (1 mole) |

The gases evolved had the following composition:

| | |
|---|---|
| Nitrosyl chloride | 60.8 g. |
| Chlorine | 2.1 g. |
| Nitrogen dioxide | 9.4 g. |

The remaining slurry had the following composition:

| | |
|---|---|
| Potassium chloride | 0.4 g. |
| Hydrogen chloride | 0.3 g. |
| Nitric acid | 103.9 g. |
| Water | 37.3 g. |
| Potassium nitrate | 49.9 g. |

Conversions were as follows:

| | |
|---|---|
| Overall chloride ion to nitrosyl chloride | 93% |
| Overall chloride ion to chlorine | 3% |
| Potassium chloride to nitrosyl chloride | 99% |
| Hydrogen chloride to nitrosyl chloride | 87% |
| Potassium chloride to chlorine | 0% |
| Hydrogen chloride to chlorine | 12% |
| Overall nitrogen dioxide to nitrosyl chloride | 93% |

What we claim is:

1. A process for the preparation of nitrosyl chloride which comprises reacting together hydrogen chloride and nitrogen dioxide in the presence of an aqueous nitric acid medium which has a nitric acid concentration of 65 to 75 percent by total weight of nitric acid and water, the reaction being carried out at a temperature of up to 50° C.

2. A process according to claim 1 in which the reactants also comprise a metal chloride or ammonium chloride.

3. A process according to claim 2 in which the mole ratio of hydrogen chloride to the metal chloride or ammonium chloride is from 3:2 to 2:3.

4. A process according to claim 2 in which the metal chloride is an alkali metal chloride.

5. A process according to claim 4 in which the alkali metal chloride is potassium chloride.

6. A process according to claim 1 in which the temperature is up to 20° C.

7. A process according to claim 6 in which the temperature is from −10° C. to +10° C.

8. A process according to claim 6 in which the temperature is from 10° C. to 20° C.

9. A process according to claim 1 in which the hydrogen chloride is obtained by pyrolysis of 1,2-dichloroethane.

* * * * *